UNITED STATES PATENT OFFICE.

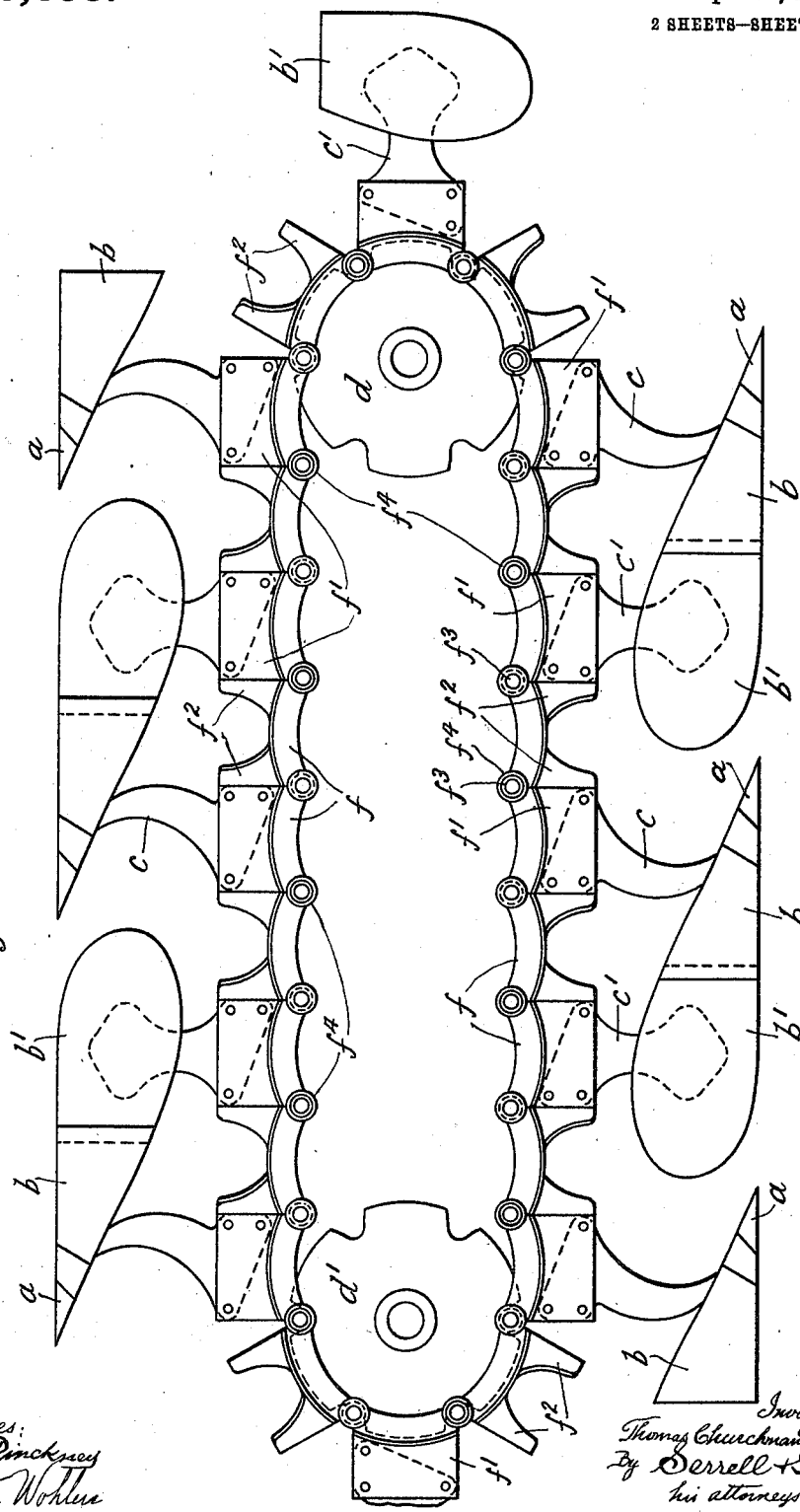

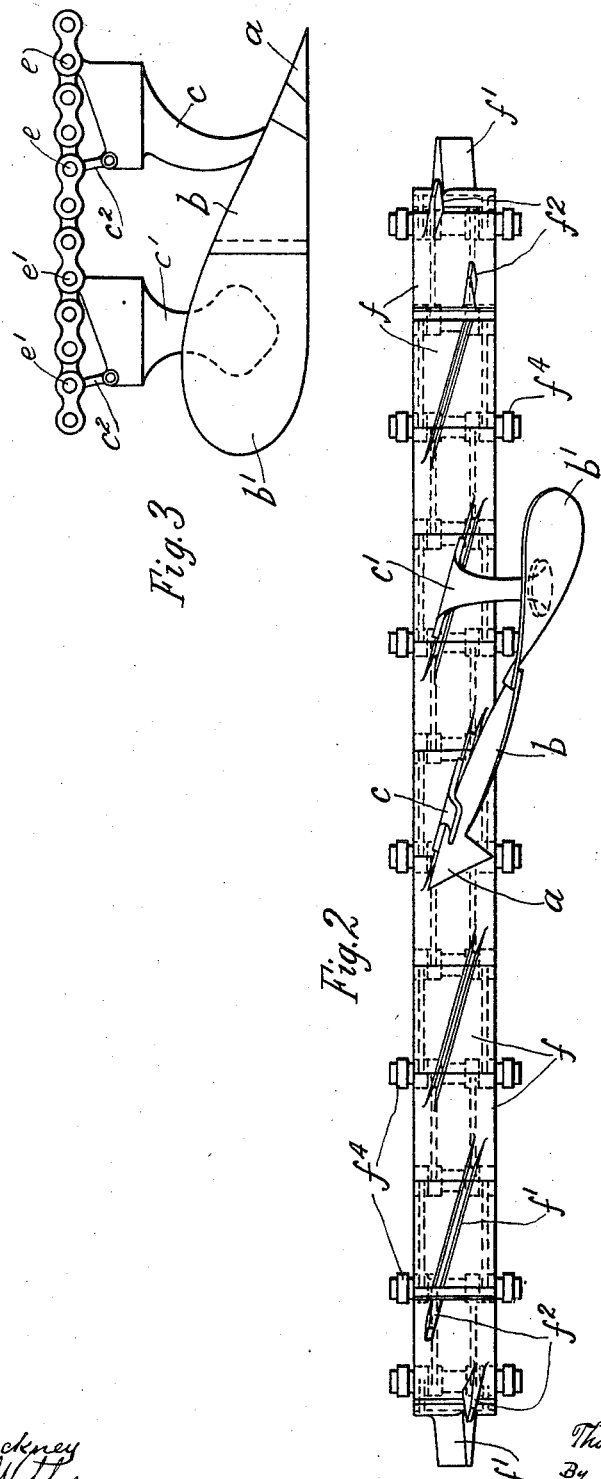

THOMAS CHURCHMAN DARBY, OF WICKFORD, ENGLAND.

IMPLEMENT FOR CULTIVATING OR PLOWING LAND.

1,038,858.  Specification of Letters Patent.  Patented Sept. 17, 1912.

Application filed June 5, 1912. Serial No. 701,725.

*To all whom it may concern:*

Be it known that I, THOMAS CHURCHMAN DARBY, a subject of the King of Great Britain, residing at Wickford, in the county of Essex, England, have invented new and useful Improvements in or Connected with Implements for Cultivating or Plowing Land, of which the following is a specification.

The invention relates to that type of cultivating or plowing implement in which shares and plow breasts are mounted on chains and are driven through the land. In such implements the cultivating tools are generally driven in a backward or oblique direction, thereby assisting in propelling the implement. A difficulty has arisen in constructing the plow breasts so that they will turn over the land and will pass around the chain wheels. The plow breast, in passing around the chain wheel when leaving the land, assumes a vertical position, and the rear end of the breast, if the tool were sufficiently low to properly turn over the soil, would dig into the soil and either break or put so much work on the engine that it would be expensive to operate, and, in some cases, the implement would not run at all.

The object of the present invention is to provide a suitable form of plow which can be lowered sufficiently to properly turn over the soil and which will pass easily around the chain wheels or the like by which the chains are carried and driven.

The invention is illustrated in the accompanying drawings, in which:—

Figure 1 is a side elevation of a set of the improved plows carried by an improved form of chain, and Fig. 2 is a plan of the chain showing one plow attached thereto. Fig. 3 shows one of the improved plows carried by a chain of ordinary construction.

In carrying the invention into effect I employ a share $a$ and plow breast of usual form, and I cut this latter in half about mid-way between its ends, or I form it in two separate pieces $b$, $b'$. Each end of the breast is separately mounted on the chain by means of a suitable holder or carrier $c$, $c'$, so that the front part $b$ leaves the rear part $b'$ when the plow is passing around a chain wheel $d$ and is rising out of the ground. Then the rear part leaves the ground and again joins the front part along the top stretch of the chain. When the plow arrives at the second chain wheel $d'$ the front portion $b$ of the breast leaves the rear portion $b'$ and first enters the ground, after which the rear portion $b'$ again joins the front portion $b$. The plows then act in the ordinary manner turning over the soil. When employing a chain of ordinary construction as shown in Fig. 3, having for instance, a $2\frac{1}{2}$ inch pitch, I may attach one holder $c$ to rivets or pins $e$, $e$, located $7\frac{1}{2}$ inches apart, and the other holder $c'$ to rivets or pins $e'$, $e'$, likewise $7\frac{1}{2}$ inches apart, and I may leave a space of $7\frac{1}{2}$ inches between the adjacent ends of the holders. One end of a holder may be connected direct to one rivet or pin and the other end may be connected by a link $c^2$ to the other rivet or pin.

Instead of employing an ordinary chain I prefer to employ a chain flexible in one direction only. Such chains are usually made with projections on the links which come into contact with each other when the chain is straight. In my preferred form of chain, as shown in Figs. 1 and 2, I employ long links $f$, the intermediate ones having plates $f'$ to which the plow holders $c$, $c'$, are secured. Some of the links have projections $f^2$ at their ends, near to the rivets $f^3$, which projections come into contact with the ends of the projecting plates $f'$ and retain the chain rigid when any attempt is made to bend it in the opposite direction to that in which it bends when passing around the chain wheels $d$ $d'$. On the ends of some of the rivets are mounted guide rollers $f^4$ running in the usual guides, not shown. The employment of long links and the use of a chain which is rigid in one direction, enable me to use two guide rollers only for each plow holder or carrier, instead of four as in previous construction.

With the old form of chain and plows a considerable strain was put upon the guide rollers which run in guides. Each plow acted as a lever and as the base of the single holder was only seven and a half inches long, considerable pressure was exerted on the rollers. With the improved chain, which is rigid in one direction between two chain wheels, the strain is distributed over the entire lower stretch of the chain, which is about 70 inches long, thereby improving the wearing quality of the machine.

Having now fully described and ascertained my said invention and the manner in which it is to be performed, I declare that what I claim is:—

1. In an implement for plowing or cultivating land, the combination of chain wheels, a chain running on said chain wheels, divided plows carried by said chain, each plow breast being made in two parts and each of said parts being carried by separate links so that the two parts separate when passing around the chain wheels, substantially as set forth.

2. In an implement for plowing or cultivating land, the combination of chain wheels, a chain running on said chain wheels, projections carried by the links of the chain which come into contact with each other when the chain is straight, and divided plows, each half of each plow being carried by separate projections on the chain, substantially as set forth.

3. In an implement for plowing or cultivating land, the combination of chain wheels, a chain running on said chain wheels, projections on each link which come into contact with each other when the chain is straight, some of said projections being in the form of plates, plow holders fixed to said plates, and divided plow breasts each part of which is fixed to one of two adjacent plow holders, substantially as shown and described.

4. In an implement for plowing or cultivating land, the combination of chain wheels, a chain on said wheels, projections on each link of the chain which come into contact when the chain is straight, guide rollers carried by the ends of the chain links, and divided plow breasts carried by separate projections on the chain, substantially as shown and described.

In witness whereof I have hereunto set my hand in presence of two witnesses.

THOMAS CHURCHMAN DARBY.

Witnesses:
CLAUDE K. MILLS,
WM. GIRLING.

---

Copies of this patent may be obtained for five cents each, by addressing the "Commissioner of Patents, Washington, D. C."